United States Patent [19]
Watanabe et al.

[11] Patent Number: 6,049,425
[45] Date of Patent: Apr. 11, 2000

[54] MULTIPLE-STAGE OPTICAL ISOLATOR

[75] Inventors: Toshiaki Watanabe; Shin Sugiyama; Toshihiko Ryuo, all of Gunma, Japan

[73] Assignee: Shin-Etsu Chemical Co., Ltd., Tokyo, Japan

[21] Appl. No.: 08/884,346

[22] Filed: Jun. 27, 1997

[30] Foreign Application Priority Data

| Jul. 2, 1996 | [JP] | Japan | ................................ 8-171983 |
| Jul. 3, 1996 | [JP] | Japan | ................................ 8-173509 |

[51] Int. Cl.[7] .................................................. G02B 5/30
[52] U.S. Cl. ........................ 359/484; 359/495; 359/497; 372/703
[58] Field of Search ........................... 372/703; 359/484, 359/494, 495, 496, 497

[56] References Cited

U.S. PATENT DOCUMENTS

| 4,974,944 | 12/1990 | Chang ..................................... 359/497 |
| 5,208,876 | 5/1993 | Pan ............................................ 385/11 |
| 5,381,261 | 1/1995 | Hirai et al. ............................... 372/703 |
| 5,428,477 | 6/1995 | Siroki ....................................... 372/703 |
| 5,446,578 | 8/1995 | Chang et al. ............................ 359/484 |
| 5,566,259 | 10/1996 | Pan et al. ................................. 359/497 |
| 5,768,015 | 6/1998 | Pattie ....................................... 372/703 |
| 5,774,264 | 6/1998 | Konno et al. ............................ 359/484 |
| 5,835,270 | 11/1998 | Urino et al. ............................. 359/484 |

FOREIGN PATENT DOCUMENTS

| 4-264515 | 9/1992 | Japan .................................... 372/703 |
| 5-196890 | 8/1993 | Japan .................................... 372/703 |
| 5-257084 | 10/1993 | Japan .................................... 372/703 |
| WO 94/09400 | 4/1994 | WIPO . |

*Primary Examiner*—Cassandra Spyrou
*Assistant Examiner*—John Juba, Jr.
*Attorney, Agent, or Firm*—McAulay Nissen Goldberg Kiel & Hand, LLP

[57] ABSTRACT

The present multiple-stage optical isolator has low polarization-dependency and low polarization-mode dispersion but does not require a long time for the assembly. It is constructed of a first unit having a first Faraday rotator placed within a magnetic field and at least one birefringent crystal sandwiching the Faraday rotator, these components being arranged in order from the light incident side; and a second unit having a second Faraday rotator placed within a magnetic field and at least one birefringent crystal sandwiching the Faraday rotator, these components being arranged in order from the light incident side, wherein the first and second units are arranged in order along the direction of the light transmission.

4 Claims, 2 Drawing Sheets

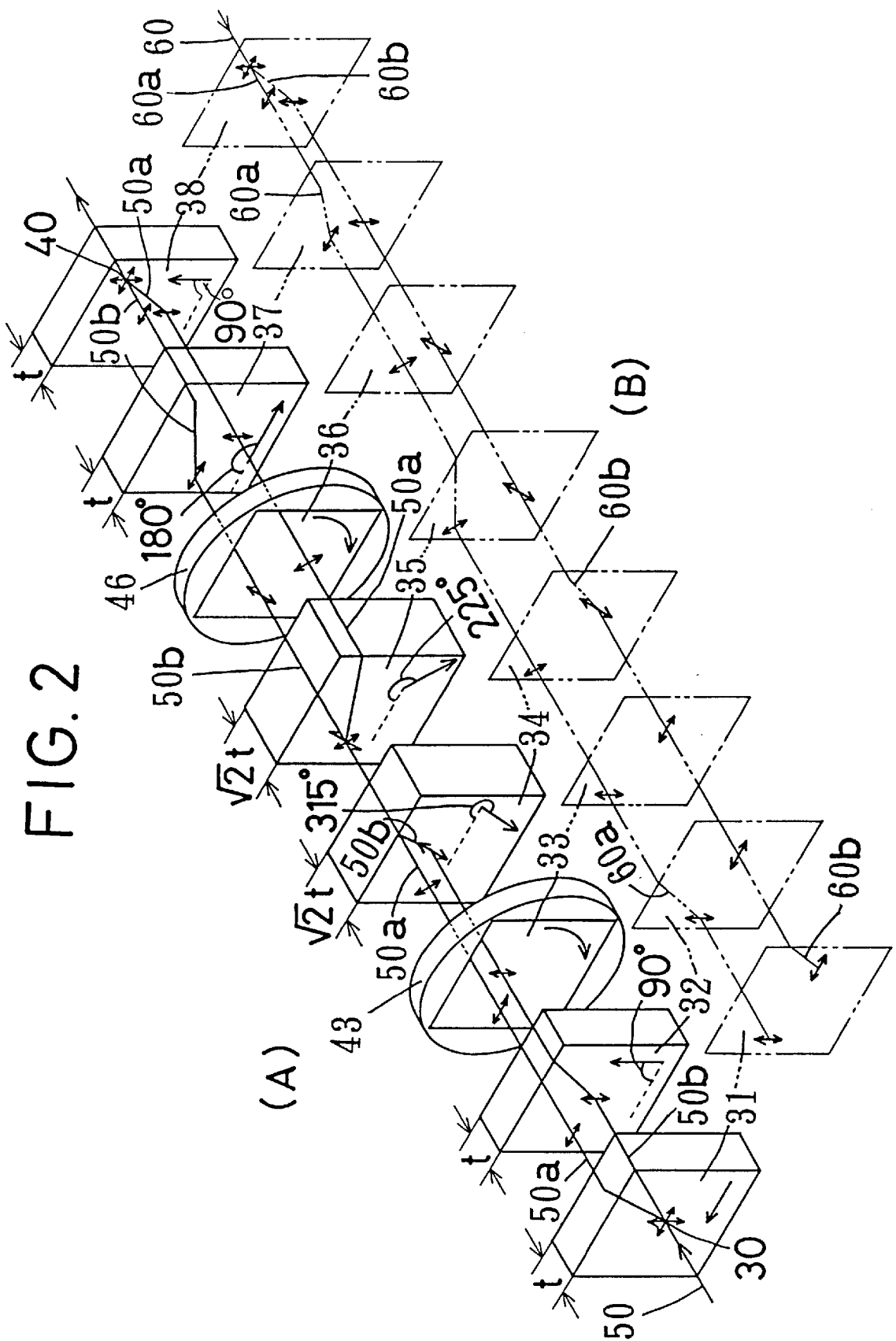

MULTIPLE-STAGE OPTICAL ISOLATOR

BACKGROUND OF THE INVENTION

The present invention relates to a multiple-stage optical isolator which is positioned between a semiconductor laser as a light source and a light-transmitting part, for instance, in an optical transmission system to thus prevent a laser beam reflected by the optical transmission part from returning to the light source.

In the optical transmission, transmitted light rays which are emitted from a semiconductor laser as a light source are reflected by various kinds of optical transmission parts arranged on the transmission line and the reflected light rays often return to the semiconductor laser. The reflected light rays interfere with the light-emitting action of the semiconductor laser and often become a cause of noises. The optical isolator is provided in the course of the light transmission line to eliminate such noises. More specifically, the optical isolator permits the transmission of only the light rays progressing towards the direction of transmission, while preventing the reflected light rays which progress in the direction opposite to the light-transmitting direction from returning back to the semiconductor laser.

The optical isolators are divided into the polarization-dependent type optical isolator which is affected by the plane of polarization of the incident light rays and the polarization-independent type optical isolator which is not affected by the plane of polarization of the incident light rays. The polarization-dependent type optical isolator permits the transmission of only the light rays whose plane of polarization is adapted to the isolator and cannot transmit any light rays having other planes of polarization. Thus, the polarization-dependent type optical isolator exhibits a high optical insertion loss in the direction of transmission and accordingly, there has in general been used the polarization-independent type optical isolator which makes use of a birefringent crystal.

The polarization-independent type optical isolator separates and couples light rays by the action of a birefringent crystal so that it permits the transmission of only the light rays progressing along the direction of transmission, while keeping the reflected light rays which progress in the direction opposite to the light-transmitting direction away from the optical path to thus prevent the reflection back thereof to the semiconductor laser.

An article of Kok Wai Chang et al. (Optical Letters, 1990, April 15, Vol. 15, No. 8) discloses a multiple-stage polarization-independent type optical isolator. A light beam incident upon the optical isolator is divided into two beams and they progress while repeating the axial displacement due to the action of the birefringent crystal. These two light beams are different from one another in the number of the axial displacements within the optical isolator and accordingly, their optical path lengths till they are outputted from the optical isolator are in turn different from one another. For this reason, the optical isolator exhibits high polarization-dependency and polarization-mode dispersion.

Japanese Patent Provisional Publication No. Hei 4-264516 investigates a method for preventing any deterioration of optical characteristics of an optical isolator which comprises variously changing the thickness of each birefringent crystal incorporated into the optical isolator. However, the thickness ratio of the birefringent crystals incorporated therein is not specified and this accordingly, makes the structure of the isolator quite complicated and the assembly thereof requires a long period of time.

SUMMARY OF THE INVENTION

The present invention has been developed for solving the foregoing problems and an object of the present invention is, accordingly, to provide a multiple-stage optical isolator which has low polarization-dependency and polarization-mode dispersion, which does not require a long time for assembly.

The multiple-stage optical isolator of the present invention comprises a first unit which comprises a first Faraday rotator placed within a magnetic field and at least one birefringent crystal sandwiching the Faraday rotator, these components being arranged in order from the light-incident side; and a second unit which comprises a second Faraday rotator placed within a magnetic field and at least one birefringent crystal sandwiching the Faraday rotator, these components being arranged in order from the light incident side, wherein the first and second units are arranged in order along the direction of the light transmission.

BRIEF DESCRIPTION OF THE DRAWINGS

FIG. 2 is a perspective view showing another embodiment of the multiple-stage optical isolator according to the present invention.

DETAILED EXPLANATION OF THE INVENTION

Figure 1:
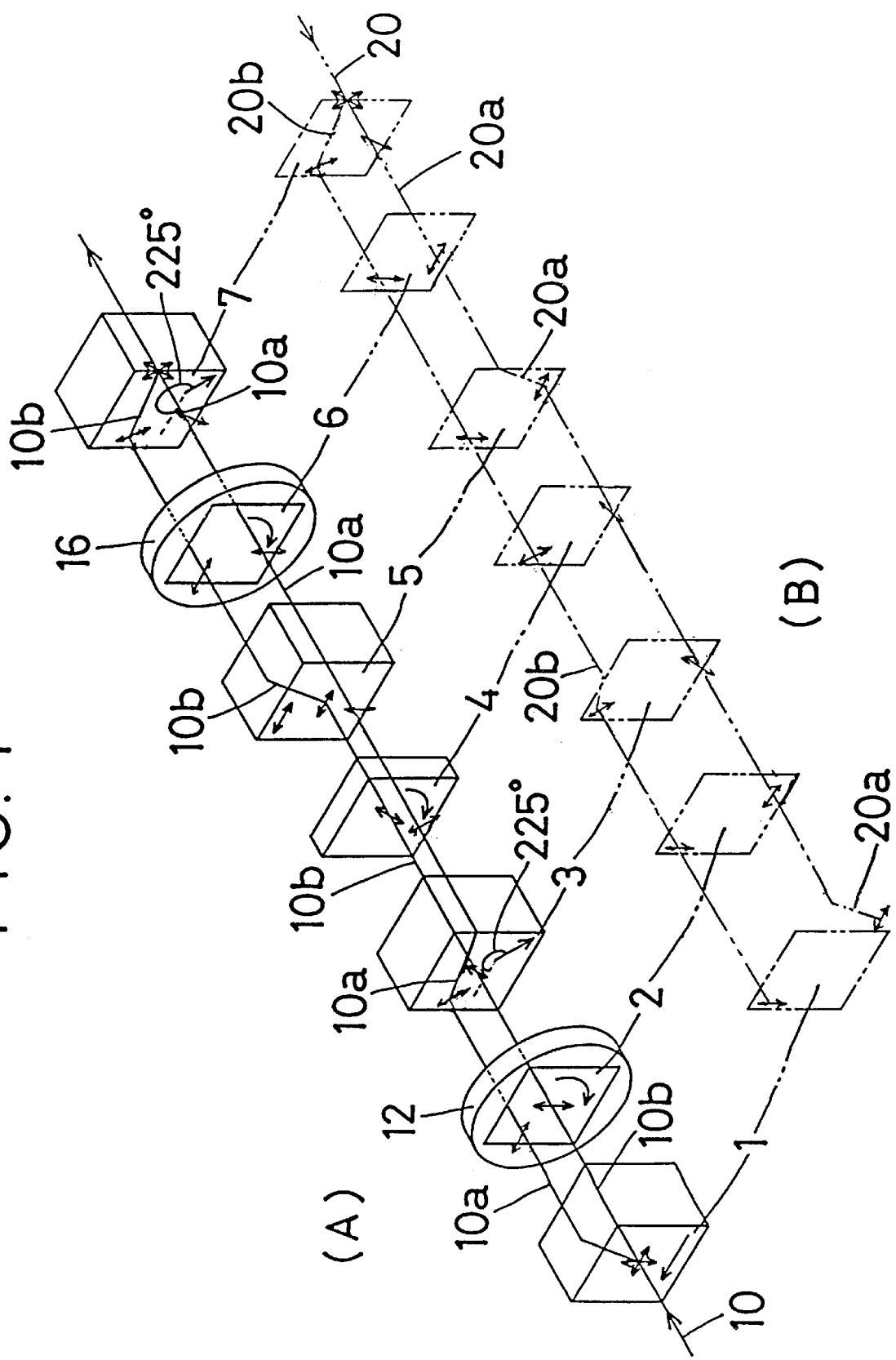
FIG. 1 is a perspective view showing an embodiment of the multiple-stage optical isolator according to the present invention.

The multiple-stage optical isolator of the present invention which has been developed to achieve the foregoing object comprises, as shown in FIG. 1, a first unit which comprises a first Farady rotator 2 placed within a magnetic field and at least one birefringent crystal 1, 3 sandwiching the Faraday rotator, these components being arranged in order from the light-incident side; and a second unit which comprises a second Faraday rotator 6 placed within a magnetic field and at least one birefringent crystal 5, 7 sandwiching the Faraday rotator, these components being arranged in order from the light incident-side, wherein the first and second units are arranged in order along the direction of the light transmission.

In the foregoing multiple-stage optical isolator, it is desirable that a first birefringent crystal 1, a second birefringent crystal 3, a third birefringent crystal 5 and a fourth birefringent crystal 7 whose thicknesses and polarization-separation optical axes are the same be arranged in this order from the light-incident side, that the first Farady rotator 2 placed within a magnetic field be positioned between the first and second birefringent crystals 1 and 2, that the second Faraday rotator 6 placed within a magnetic field be positioned between the third and fourth birefringent crystals 5 and 7 and that a halfwave plate 4 be positioned between the second and third birefringent crystals 3 and 5, as shown in FIG. 1.

The polarization-separation optical axis is preferably 22.5°. It is sufficient that the angle of the direction of the separation optical axis for the second birefringent crystal 3 from the direction of the first birefringent crystal 1 is 225°, that the separation optical axis of the third birefringent crystal 5 is consistent with that of the first birefringent crystal 1 and that the angle of the direction of the separation optical axis for the fourth birefringent crystal 7 from the direction of the first birefringent crystal 1 is 225°.

Alternatively, the multiple-stage optical isolator may comprise, as shown in FIG. 2, a first birefringent crystal 31, a second birefringent crystal 32 having a thickness identical to that of the first birefringent crystal 31, a third birefringent crystal 34 having a thickness $2^{1/2}$ time that of the first birefringent crystal 31, a fourth birefringent crystal 35 having a thickness $2^{1/2}$ time that of the first birefringent crystal 31, a fifth birefringent crystal 37 having a thickness identical to that of the first birefringent crystal 31 and a sixth birefringent crystal 38 having a thickness identical to that of the first birefringent crystal 31, which are arranged in this order from the light-incident side; wherein the angle of the direction of the separation optical axis for the second birefringent crystal 32 from the direction of the first birefringent crystal 31 is 90°, the angle of the separation optical axis of the third birefringent crystal 34 from the direction of the first birefringent crystal 31 is 315°, the angle of the direction of the separation optical axis for the fourth birefringent crystal 35 from that of the first birefringent crystal 31 is 225°, the angle of the direction of the separation optical axis for the fifth birefringent crystal 37 therefrom is 180° and the angle of the direction of the separation optical axis for the sixth birefringent crystal 38 therefrom is 90°; the first Faraday rotator 33 is positioned between the second and third birefringent crystals 32 and 34 and the second Faraday rotator 36 is positioned between the fourth and fifth birefringent crystals 35 and 37; the polarization-rotation direction of the first Faraday rotator 33 is in agreement with that of the second Faraday rotator 36 and the rotational angles of the first and second Faraday rotators 33 and 36 are 45°.

Examples concerning preferred embodiments of the present invention will hereinafter be described in detail, but the present invention is not restricted to these specific Examples at all.

FIG. 1 is a perspective view showing an embodiment of the multiple-stage optical isolator according to the present invention. As shown in FIG. 1(A), four birefringent crystals 1, 3, 5, 7 are arranged in this order from the light-incident side. These birefringent crystals 1, 3, 5, 7 have the same thickness and the polarization-separation optical axes thereof are all 22.5°. The angles of the birefringent crystals 3, 7 from the direction of the optical axis of the birefringent crystal 1 are 225° and the direction of the optical axis of the birefringent crystal 5 is consistent with that of the birefringent crystal 1. A rotator 2 is positioned between the birefringent crystals 1 and 3, a halfwave plate 4 (reciprocal element) is arranged between the birefringent crystals 3 and 5 and a Faraday rotator 6 is positioned between the birefringent crystals 5 and 7. These Faraday rotators 2 and 6 are surrounded by magnets 12 and 16 respectively. These magnets 12 and 16 are arranged in the same direction.

FIG. 1(A) shows the transmission of the light beam 10 emitted from a semiconductor laser (not shown) as a light source through the isolator. The light beam 10 is incident upon the birefringent crystal 1 and divided into a light beam 10a which undergoes an axial displacement and a light beam 10b which goes straight as it is. The light beams 10a and 10b are rotated at an angle of 45° in the Faraday rotator 2, respectively and only the light beam 10a undergoes an axial displacement in the birefringent crystal 3. The light beams 10a and 10b are incident upon the halfwave plate 4, are rotated at an angle of 45° in the same direction observed for the preceding rotation and only the light beam 10b undergoes an axial displacement in the birefringent crystal 5. The light beams 10a and 10b are incident upon the Faraday rotator 6, rotated at an angle of 45° therein in the same direction observed for the preceding rotations and then incident upon the birefringent crystal 7. At this stage, only the light beam 10b undergoes an axial displacement, hence these light beams 10a and 10b are coupled, outputted from the optical isolator and then transmitted to a light-transmitting part (not shown). As has been described above, the light beams 10a and 10b have the same number of axial displacement and the same optical path length.

Almost all of the light rays 10 are transmitted to the light-transmitting part, but a part of the light rays reflected by, for instance, the light-transmitting part (not shown) is incident upon the birefringent crystal 7 from the opposite direction as a reflected light rays 20 as shown in FIG. 1(B). The reflected light beam 20 is divided into a light beam 20a which goes straight as it is and a light beam 20b which undergoes an axial displacement. The light beams 20a and 20b are incident upon the Faraday rotator 6, then rotated at an angle of 45° and incident upon the birefringent crystal 5. At this stage, only the light beam 20a undergoes an axial displacement and this results in an increase in the separation distance there between. The light beams 20a and 20b are incident upon the halfwave plate 4, then rotated at an angle of 45° therein and incident upon the birefringent crystal 3. Only the light beam 20b undergoes an axial displacement due to the action of the birefringent crystal 3 and this leads to a further increase in the separation distance there between. Thereafter, the light beams 20a and 20b are incident upon the Faraday rotator 2, then rotated at an angle of 45° respectively and incident upon the birefringent crystal 1. At this stage, only the light beam 20a undergoes an axial displacement and accordingly, these light beams 20a and 20b never return to the semiconductor laser as a light source.

Test Experiment 1 was carried out as follows, wherein an optical isolator as shown in FIG. 1 was produced and the resulting isolator was inspected for the polarization-dependency and the polarization-mode dispersion:

Test Experiment 1

In this test example, rutile crystalline plates were used as the birefringent crystals 1, 3, 5, 7; a Bi-substituted rare earth metal iron garnet was used as the material for the Faraday rotators 2, 6; and quartz was used as a base material for the halfwave plate 4.

The Faraday rotator 2 surrounded by a magnet 12 was positioned between the birefringent crystals 1 and 2 to thus give a unit. The direction of the optical axis of the birefringent crystal 3 intersects that of the birefringent crystal 1 at an angle of 225°.

Separately, the Faraday rotator 6 surrounded by a magnet 16 was positioned between the birefringent crystals 5 and 7 to thus give another unit. The direction of the optical axis of the birefringent crystal 7 makes an angle of 225° with respect to that of the birefringent crystal 5.

These units were arranged in order in such a manner that the birefringent crystal 3 faced towards the birefringent crystal 5 and the halfwave plate 4 was positioned between the birefringent crystal 3 and the birefringent crystal 5 to give an optical isolator. The magnets 12 and 16 were arranged in one direction so that the Faraday rotators 2 and 6 could rotate the polarization planes of light beams at an angle of 45° in the same direction. The position of the halfwave plate 4 was adjusted so that it could rotate the incident light beam 10 at an angle of 45° in the same direction rotated by the Faraday rotators 2 and 6.

It was found that the polarization-dependency of the resulting optical isolator was 0.03 dB and that the polarization-mode dispersion thereof was 0.01 ps. The separation distance between the reflected light beams 20a and 20b was found to be 3.7, while that observed for an optical isolator comprising two-stage of the structure, i.e., birefringent crystal-wave plate-Faraday rotator-birefringent crystal was 4.0.

FIG. 2 is a perspective view showing another embodiment of the multiple-stage optical isolator according to the present invention. As shown in FIG. 2(A), six birefringent crystals 31, 32, 34, 35, 37 and 38 are aligned in this order from the light-incident side. If the thickness of the birefringent crystal 31 is represented by t, the thickness of the birefringent crystal 32, 34, 35, 37 or 38 can be represented by t, $2^{1/2}$t, $2^{1/2}$t, t or t respectively. If the direction of the optical axis of the birefringent crystal 31 is defined to be 0°, that of the birefringent crystal 32, 34, 35, 37 or 38 is 90°, 315°, 225°, 180° or 90° respectively. The Faraday rotator 33 is arranged between the birefringent crystal 32 and 34, while the Faraday rotator 36 is arranged between the birefringent crystal 35 and 37. These Faraday rotators 33 and 36 are surrounded by magnets 43 and 46 respectively. The directions of these magnets 43 and 46 are identical to one another.

FIG. 2(A) shows the transmission of the light beam 50 emitted from a semiconductor laser (not shown) as a light source through the isolator. The light beam 50 is incident upon a point 30 on the surface of the birefringent crystal 31 and divided into a light beam 50a which undergoes an axial displacement and a light beam 50b which goes straight as it is. The light beams 50a and 50b are both incident upon the birefringent crystal 32 and only the light beam 50b undergoes an axial displacement. The light beams 50a and 50b are then incident upon the Faraday rotator 33, rotated at an angle of 45° respectively, only the light beam 50b undergoes an axial displacement within the birefringent crystal 34 so that these light beams 50a and 50b are coupled. The light beams 50a and 50b are incident upon the birefringent crystal 35 and only the light beam 50a undergoes an axial displacement. Both of these light beams 50a and 50b are incident upon the Faraday rotator 36, rotated at an angle of 45° therein in the same direction observed for the preceding rotation and then incident upon the birefringent crystal 37. Only the light beam 50b undergoes an axial displacement due to the action of the birefringent crystal 37 and then the light beams 50a and 50b are incident upon the birefringent crystal 38. The light beam 50a undergoes an axial displacement and as a result, the light beams 50a and 50b are coupled. The light beams 50a and 50b are outputted from a point 40 on the surface of the birefringent crystal 38 (on the output side) and directed towards an optical transmitting part (not shown). The light-incident point 30 on the birefringent crystal 31 and the output point 40 on the birefringent crystal 38 are situated at the same level and accordingly, the resulting optical isolator never shows any increase in the polarization-dependency and the polarization-mode dispersion.

Almost all of the light rays 50 are transmitted to the optical transmitting part, but a part of the light rays reflected by, for instance, the optical transmitting part (not shown) is incident upon the birefringent crystal 38 from the opposite direction as a reflected light rays 60 as shown in FIG. 2(B). The reflected light beam 60 is divided into a light beam 60a which goes straight as it is and a light beam 60b which undergoes an axial displacement. The light beams 60a and 60b are incident upon the birefringent crystal 37 and only the light beam 60a undergoes an axial displacement. Then these light beams incident upon the Faraday rotator 36 are rotated at an angle of 45° respectively and incident upon the birefringent crystal 35. At this stage, only the light beam 60a undergoes an axial displacement within the birefringent crystal 35 and the separation distance between these light beams is thus enlarged. The light beams 60a and 60b are incident upon the birefringent crystal 34 and only the light beam 60b undergoes an axial displacement therein. Then the light beams 60a and 60b are incident upon the Faraday rotator 33, rotated at an angle of 45° therein respectively and incident upon the birefringent crystal 32. Only the light beam 60a undergoes an axial displacement within the birefringent crystal 32. The light beams 60a and 60b are incident upon the birefringent crystal 31, only the light beam 60b undergoes an axial displacement. This leads to a further increase in the separation distance there between. Accordingly, these light beams 60a and 60b never return to the semiconductor laser as a light source.

Test Experiment 2 was carried out as follows, wherein an optical isolator as shown in FIG. 2 was produced and the resulting isolator was inspected for the polarization-dependency and the polarization-mode dispersion:

Test Experiment 2

Birefringent crystals 31, 32, 37 and 38 having a thickness of 1.000 mm were cut out from the same crystal plate whose polarization-separation vectorial angle of 90° and birefringent crystals 34 and 35 having a thickness of 1.414 mm were cut out from the same crystal plate whose polarization-separation vectorial angle of 45°. These birefringent crystals 31, 32, 34, 35, 37 and 38 were aligned in this order from the light-incident side and the birefringent crystals 32, 34, 35, 37 and 38 were rotated to thus adjust their optical axes. The adjustment was carried out so that the angle of the optical axis of the birefringent crystal 32 from the optical axis of the birefringent crystal 31 was 90° and the angles of the optical axes of the birefringent crystals 34, 35, 37 and 38 from the optical axis of the birefringent crystal 31 were 315°, 225°, 180° and 90°, respectively.

Bi-substituted rare earth metal iron garnet was used as a material for the Faraday rotators 33 and 36, the Faraday rotator 33 surrounded by a magnet 43 was positioned between the birefringent crystals 32 and 34 and the Faraday rotator 36 surrounded by a magnet 46 was positioned between the birefringent crystals 35 and 37. The magnets 43 and 46 were arranged such that the directions thereof are in agreement with one another and accordingly, the polarization-rotation direction of the Faraday rotators 33 and 36 is clockwise and directed towards the birefringent crystal 38 from the birefringent crystal 31 and the rotational angle of these Faraday rotators was set at 45°.

The resulting optical isolator was sandwiched between two obliquely polished fibers, the resulting assembly was inspected for the optical properties and it was found that the isolator had an optical insertion loss in the forward direction of 0.6 dB, an optical insertion loss in the opposite direction of 65 dB, a polarization-dependency of 0.02 dB and a polarization-mode dispersion of 0.01 ps.

The multiple-stage optical isolator of the present invention divides an incident light beam into two beams and outputs them after axial displacement of these beams over the same times. Thus, the separated two light beams each has the same optical path length within the optical isolator and this accordingly leads to decreases in the polarization-dependency and the polarization-mode dispersion of the optical isolator. Moreover, the optical isolator permits easy adjustment of the optical axis of a birefringent crystal and this results in the reduction of time required for the assembly of the isolator. Birefringent crystals having the same thickness can be cut out from the same crystal plate and this makes the processing of the isolator easy.

What is claimed is:

1. A multiple-stage optical isolator comprising a first unit which comprises a first Faraday rotator placed within a magnetic field and at least one birefringent crystal on each side of the Faraday rotator, these components being arranged in order from the light-incident side; a halfwave plate; and a second unit which comprises a second Faraday rotator placed within a magnetic field and at least one birefringent crystal on each side of the Faraday rotator, these components being arranged in order from the light-incident side, wherein the first unit, halfwave plate and second unit are arranged in that order along the direction of the light transmission.

2. The multiple-stage optical isolator of claim 1 wherein a first birefringent crystal, a second birefringent crystal, a third birefringent crystal and a fourth birefringent crystal are arranged in this order from the light-incident side; the first Faraday rotator placed within a magnetic field is positioned between the first and second birefringent crystals, the second Faraday rotator placed within a magnetic field is positioned between the third and fourth birefringent crystals and the halfwave plate is positioned between the second and third birefringent crystals; and the first birefringent crystal, second birefringent crystal, third birefringent crystal and fourth birefringent crystal are uniaxially birefringent and have equal thicknesses.

3. The multiple-stage optical isolator of claim 2 wherein the first birefringent crystal, second birefringent crystal, third birefringent crystal and fourth birefringent crystal each have a polarization-separation optical angle of 22.5°.

4. The multiple-stage optical isolator of claim 1 wherein a first birefringent crystal, a second birefringent crystal, a third birefringent crystal and a fourth birefringent crystal, whose thicknesses are the same, are arranged in this order from the light-incident side; the first Faraday rotator placed within a magnetic field is positioned between the first and second birefringent crystals, the second Faraday rotator placed within a magnetic field is positioned between the third and fourth birefringent crystals and the halfwave plate is positioned between the second and third birefringent crystals; and the angle of the direction of the separation optical axis for the second birefringent crystal from the separation optical axis of the first birefringent crystal is 225°, the separation optical axis of the third birefringent crystal is consistent with that of the first birefringent crystal and the angle of the direction of the separation optical axis for the fourth birefringent crystal from the separation optical axis of the first birefringent crystal is 225°.

* * * * *